W. H. H. SISUM.

Belt-Shifter.

No. 6,496. Reissued June 22, 1875.

Witnesses:

Wm. C. Dey.

Henry Gentner

Inventor:

W. H. H. Sisum by his attorney

T. D. Stetson

THE GRAPHIC CO. PHOTO-LITH. 39 & 41 PARK PLACE, N.Y.

UNITED STATES PATENT OFFICE.

WILLIAM H. H. SISUM, OF NEWARK, NEW JERSEY.

IMPROVEMENT IN BELT-SHIFTERS.

Specification forming part of Letters Patent No. 113,939, dated April 18, 1871; reissue No. 6,496, dated June 22, 1875; application filed February 15, 1875.

*To all whom it may concern:*

Be it known that I, WILLIAM H. H. SISUM, of Newark, in the county of Essex and State of New Jersey, have invented certain new and useful Improvements in Belt-Shifters, of which the following is a specification:

My invention is intended more particularly for planing-machines carrying heavy masses of machinery, or other castings, to be planed, but may be used with advantage in any situation where two belts, running in opposite directions, are to be alternately shifted from fast to loose pulleys, so as to revolve a shaft in opposite directions alternately from continuously running belts.

I can affect the shifting by moving a bar longitudinally, and transmit the motion therefrom to the belts, through the medium of pins received in a slot in the bar, which is oblique at some points, and straight or directly longitudinal at others. It acts with the effect of a wedge in shifting the belt. The wedge principle, applied to two levers so that the shifting device shall act on them successively, is the important feature of the invention. The proportions may be varied within wide limits.

The following is a description of what I consider the best means of carrying out the invention. The accompanying drawing forms a part of this specification.

Figures 1, 1A:
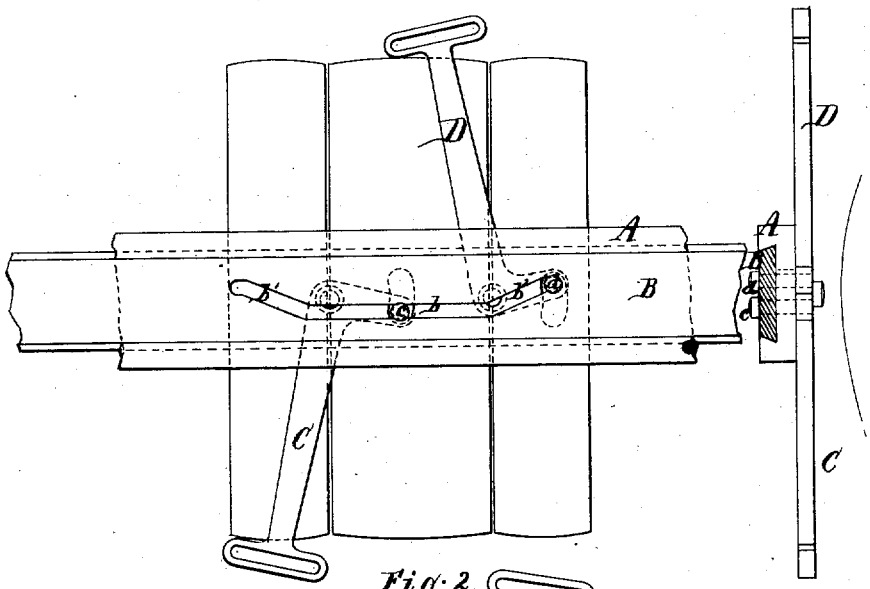
Figure 2:
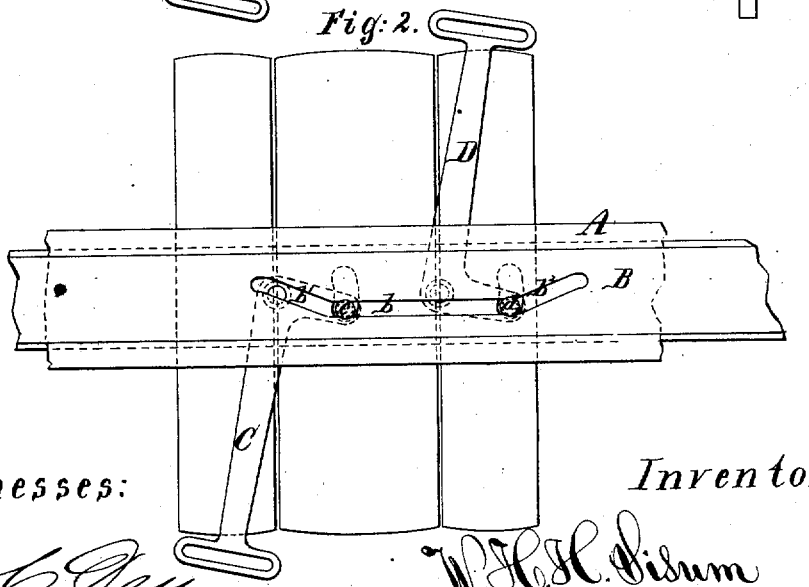

Figure 1 is a plan view, with the levers in position for receiving motion in one direction, and Fig. 2 is a plan view, showing the levers in the intermediate position which they hold after the bar has commenced to move and has thrown that belt out of action which was before in action, and has not yet thrown the other into action. Fig. $1^a$ is an elevation, showing a cross-section of the shifter-bar, and a small portion of one of the pulleys.

Similar letters of reference indicate like parts in both the figures.

A is a portion of the fixed frame-work of the machine with guides fixed thereon, which afford lateral support to the broad slide-bar B, carrying the slot $b$ $b^1$ $b^2$. The bar B may extend along the machine for any distance, and may be provided with one or more handles, by which it may be conveniently seized to be shifted forward and backward by the workmen, or it may be connected to any ordinary or suitable mechanism to change its position. C and D are bell-crank levers. The long arm of each carries a loop, through which passes a belt not represented. The short arm of each carries a pin—the pin $c$ on the lever C, and the pin $d$ on the lever D. Both the pins $c$ and $d$ stand in the slot in the slide-bar B.

The arrangement of the pulleys of the drum for driving the belts is too familiar to require minute description.

The belt which runs through the lever C is a direct or open belt; the belt which runs through the lever D is a crossed belt; and, both running on the same drum above, the pulleys on which they run below necessarily revolve in directions opposite to each other. There are one or two fast pulleys which receive the belts alternately, and consequently impart the motion to its shaft alternately in opposite directions. There are each side of the fast pulleys one or more loose pulleys.

I prefer this arrangement for various reasons, one of which is the facility which it affords for arresting the loose pulleys at any time by the hand to oil them.

The function of the belt-shifter is to shift each belt alternately from the loose pulley onto a fast pulley, and back again. In the position shown in Fig. 1, the open belt, which runs through the lever C, is running on a loose pulley, and the crossed belt, which it will be understood runs through the lever D, is running on the fast pulley. The crossed belt is therefore efficient in imparting its motion to the shaft. Now, when the bar B is moved longitudinally, the pin $d$, which is fixed in the lever D, is traversed in the oblique portion $b'$ of the slot, while the pin $c$, which is fixed in the other lever C, is traversed in the straight portion $b$ of the slot. Consequently, the first effect of the motion is to shift the lever D and carry its belt upon its loose pulley, thus leaving both belts running for a little time on their respective loose pulleys. For a very brief period both pins $c$ and $d$ are in the straight portion $b$ of the slot, but the continued movement of the slide-bar B receives the pin $c$ in the oblique part $b^1$ of the slot, and moves the lever C. This movement shifts the open belt carried by C upon the fast pulley, and commences to revolve the shaft in the direction opposite to that in which it was revolved before. The reverse of these movements at the proper period shifts the belt back again.

By reference to the figures it will be observed that, beyond the termination of the oblique part of each slot, the slot is extended a very little way directly longitudinal of the bar B, as indicated by $b^*$. This allows the bar B to come to rest gradually, without moving the belts, after both are rapidly and fully shifted to their proper positions. The slots in which the pins $c$ $d$ traverse in the fixed portion of the work, under or behind the bar B, are indicated in dotted lines. In case the arrangement of the fast and loose pulleys is reversed, so that two fast pulleys are employed outside of one or more loose pulleys, the arrangement of the inclined portions $b^1$ $b^2$ of the slot must be correspondingly changed, as will be readily understood by any good mechanic. In such case, the inclined portions will be close together like the sides of a V, and a straight portion of the slot will be outside thereof on each side.

The sides of the slots $b^1$ $b^2$ act wedgewise upon the pins $c$ $d$ during the movement of the bar B. The latter is a movable piece, suitably supported, carrying these wedging parts. The neutral portion $b$, along the center of the length of the slot, is not effective except to avoid giving motion to the belts, and to hold them against being moved by any other while the pins $c$ and $d$ are in that portion.

I claim as my invention—

1. The inclines $b^1$ $b^2$ on the movable piece B, in combination with the connections, guides for guiding the belts, and adapted to shift them in succession from one pulley to another with a simple movement of the shifter B, substantially as herein specified.

2. The connecting part $b$ of the slot $b$ $b^1$ $b^2$ in the movable piece B, adapted to hold the belts firmly in position when they are not in the act of being shifted, as herein specified.

In testimony whereof I have hereunto set my name, this 13th day of February, 1875, in presence of two subscribing witnesses.

WILLIAM H. H. SISUM.

Witnesses:
WM. C. DEY,
HENRY GENTNER.